(12) United States Patent
Zitsch et al.

(10) Patent No.: US 10,969,551 B2
(45) Date of Patent: Apr. 6, 2021

(54) SHEATHED OPTICAL RIBBON CABLE ASSEMBLY

(71) Applicants: TE Connectivity Corporation, Berwyn, PA (US); Tyco Electronics UK Ltd., Swindon (GB)

(72) Inventors: Dwight David Zitsch, Carlisle, PA (US); Zaheer Rabi, Swindon (GB)

(73) Assignees: TE CONNECTIVITY CORPORATION, Berwyn, PA (US); TYCO ELECTRONICS UK Ltd., Swindon (GB)

( * ) Notice: Subject to any disclaimer, the term of this patent is extended or adjusted under 35 U.S.C. 154(b) by 0 days.

(21) Appl. No.: 16/249,810

(22) Filed: Jan. 16, 2019

(65) Prior Publication Data
US 2020/0225431 A1 Jul. 16, 2020

(51) Int. Cl.
G02B 6/38 (2006.01)
G02B 6/44 (2006.01)
G02B 6/245 (2006.01)
G02B 6/40 (2006.01)

(52) U.S. Cl.
CPC .......... *G02B 6/3885* (2013.01); *G02B 6/245* (2013.01); *G02B 6/3861* (2013.01); *G02B 6/403* (2013.01); *G02B 6/443* (2013.01); *G02B 6/4403* (2013.01)

(58) Field of Classification Search
None
See application file for complete search history.

(56) References Cited

U.S. PATENT DOCUMENTS

| 4,261,643 | A |   | 4/1981 | Stiles et al. |   |
|---|---|---|---|---|---|
| 5,764,835 | A | * | 6/1998 | Rubin | G02B 6/4415 385/104 |
| 5,815,621 | A | * | 9/1998 | Sakai | B24B 19/226 264/1.1 |
| 6,062,740 | A | * | 5/2000 | Ohtsuka | G02B 6/3833 385/77 |
| 6,565,265 | B2 | * | 5/2003 | Ohtsuka | G02B 6/25 385/60 |

(Continued)

FOREIGN PATENT DOCUMENTS

JP 05323154 A * 12/1993
JP H07 43560 A 2/1995

OTHER PUBLICATIONS

Jones et al., "Electrical Engineer's Reference Book", Fifteenth Edition, Section 23.2.4, Buttersworth-Heinemann Ltd., 1993. (Year: 1993).*

(Continued)

*Primary Examiner* — Michelle R Connelly

(57) ABSTRACT

A cable assembly comprising: (a) a ribbon cable having a plurality of optical fibers having endfaces; (b) an elastomeric sheathing being disposed over at least a portion of the ribbon cable and terminating in a sheathing end near the endfaces such that the endfaces protrude beyond the sheathing end; (c) a ferrule having an mating surface presenting the endfaces, and a rear end having a rear opening through which the optical fibers pass, the rear end contacting the sheathing end to form an adhesive tight seal sufficient to prevent liquid adhesive in the ferrule from flowing out of the rear opening; and (d) adhesive disposed in the ferrule to secure the optical fibers to the ferrule.

19 Claims, 4 Drawing Sheets

(56) References Cited

U.S. PATENT DOCUMENTS

| | | | |
|---|---|---|---|
| 7,289,704 B1* | 10/2007 | Wagman | G02B 6/4429 |
| | | | 385/100 |
| 7,364,375 B1* | 4/2008 | Jones | G02B 6/2551 |
| | | | 385/95 |
| 2003/0152350 A1 | 8/2003 | Konda et al. | |
| 2003/0202766 A1* | 10/2003 | Medalsy | G02B 6/4448 |
| | | | 385/135 |
| 2005/0213893 A1* | 9/2005 | Hamasaki | G02B 6/3801 |
| | | | 385/80 |
| 2009/0154884 A1 | 6/2009 | Chen et al. | |
| 2009/0251697 A1 | 10/2009 | Cutillas et al. | |
| 2016/0363731 A1* | 12/2016 | Wang | H02G 15/06 |

OTHER PUBLICATIONS

Jinbo et al., machine translation of JP05-323154 A, Dec. 1993. (Year: 1993).*

Jones et al. ("Electrical Engineer's Reference Book", Fifteenth Edition, Butterworth-Heinemann Ltd., 1993, section 23.2.4.1) (Year: 1993).*

European Search Report dated Jun. 3, 2020, EP 20 15 2117, Application No. 20152117.6-1230.

* cited by examiner

SHEATHED OPTICAL RIBBON CABLE ASSEMBLY

FIELD OF INVENTION

The present invention relates, generally, to optical ribbon cable, and, more specifically, to a sheathed optical ribbon cable terminated with a ferrule, which is abrasion and/or chemical/heat resistant.

BACKGROUND

Optical ribbon cable is used commonly to connect optical components together and is a convenient solution for applications having space and weight limitations. A conventional ribbon comprises optical fibers, which are placed side-by-side and encapsulated with a coating or a tape, for example, Mylar, to form a strip of optical fibers. A single ribbon may contain, for example, 4, 8, 12, or more optical fibers.

The advantage of utilizing ribbon fiber cables resides in the ability to achieve a much higher density in a patch panel, cable routing/ducting, and device connection environments, without compromising the quality or quantity of the connection. Because the ribbon contains only coated optical fibers, this type of cable takes up much less space than individually buffered optical fibers. As a result, ribbon cables are denser than any other cable design. They are ideal for applications where limited space is available, such as in an existing conduit that has very little room left for an additional cable.

Although ribbon cable is a good solution for high density optical applications, their absence of a buffer makes them susceptibility to abrasion, which necessitates taking certain precautions that complicate the assembly/installation process. Specifically, ribbon cable cannot rub against other objects, and, thus, in environments involving vibration, the cable must be secured with tiedowns and other mechanical means to prevent it from rubbing against other objects. The need for such tiedowns not only introduces additional steps/expense in the installation process, but also often presents challenges because a purchase point for a tiedown is not often available. Accordingly, Applicant has identified the need for an abrasion resistant ribbon cable that minimizes the need for tiedowns and other mechanical restraints. Furthermore, as the use of ribbon cables becomes more prevalent in rugged and demanding applications, such as aerospace, Applicant also identifies the need for a ribbon cable that is chemically and thermally resistant. The present invention fulfills these needs, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the invention relates to a cable assembly comprising: (a) a ribbon cable having a plurality of optical fibers having endfaces; (b) an elastomeric sheathing being disposed over at least a portion of the ribbon cable and terminating in a sheathing end near the endfaces such that the endfaces protrude beyond the sheathing end; (c) a ferrule having an mating surface presenting the endfaces, and a rear end having a rear opening through which the optical fibers pass, the rear end contacting the sheathing end to form an adhesive tight seal sufficient to prevent liquid adhesive in the ferrule from flowing out of the rear opening; and (d) adhesive disposed in the ferrule to secure the optical fibers to the ferrule.

In another embodiment, the invention relates to a method of preparing a cable assembly comprising: (a) disposing the elastomeric sheathing over a ribbon cable having a plurality of optical fibers; (b) stripping the optical fibers and the sheathing to form stripped optical fibers that protrude beyond an end of the sheathing; (c) inserting the stripped optical fibers through a rear opening at a rear of a ferrule such that (i) endfaces of the stripped optical fibers protrude beyond a mating face of the ferrule, and (ii) the end of the sheathing contacts the rear to form an adhesive-tight seal between the ferrule and the sheathing; (d) disposing liquid adhesive in the ferrule; and (e) causing the liquid adhesive to cure.

DETAILED DESCRIPTION

Figure 1:
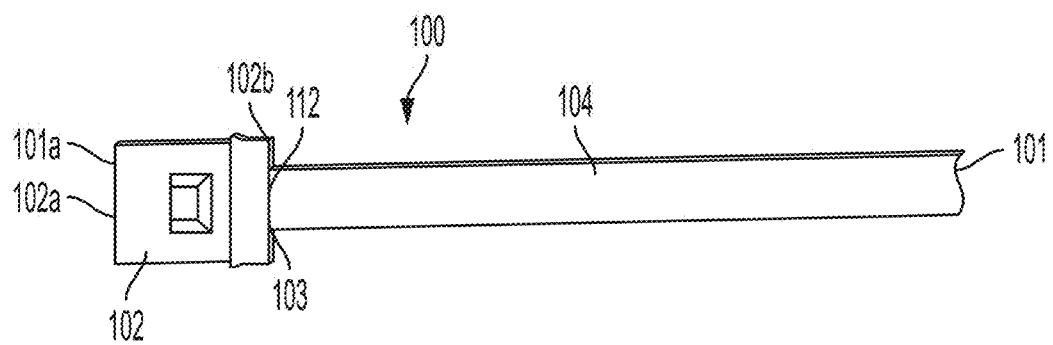
FIG. 1 shows one embodiment of the ribbon cable assembly of the present invention.

Referring to FIG. 1, one embodiment of the cable assembly 100 of the present invention is shown. In this embodiment, the cable assembly 100 comprises a ribbon cable 101, comprising a plurality of optical fibers (not shown) having fiber endfaces 101a, and an elastomeric sheathing 104 being disposed over at least a portion of the ribbon cable and terminating at a sheathing end 103, short of the endfaces 101a such that the endfaces 101a protrude beyond the sheathing end 103. The cable assembly 100 also comprises a ferrule 102 having a mating surface 102a presenting the endfaces 101a, and a rear end 102b defining a rear opening 112 through which the optical fibers pass. The rear end 102b contacts the sheathing end 103 to form a liquid adhesive tight seal sufficient to prevent liquid adhesive in the ferrule from flowing out of the rear end. In its final form, the cable assembly 100 comprises cured adhesive disposed in the ferrule to secure the optical fibers to the ferrule.

An important aspect of the claimed invention is the elastomeric sheathing surrounding the ribbon cable to provide abrasion and/or chemical and/or heat resistance. Suitable elastomeric materials will be obvious to those of skill in the art in light of this disclosure. In one embodiment, the elastomeric material comprises a halogen-based material, such as, for example, a fluoropolymer, such as Polyvinylidene fluoride or polyvinylidene difluoride (PVDF), fluorinated ethylene propylene (FEP), perfluoroalkoxy polymer (PFA), or polytetrafluoroethylene (PTFE). In another embodiment, the elastomeric material comprises a silicon-based rubber or other rubber. In one embodiment, the elastomeric material is a heat shrink material, such as, for example, Versafit™ tubing, commercially available through Raychem, TE Conductivity. Versafit tubing is made from a crosslinked polyolefin to provide high flame retardance (VW-1), excellent flexibility, and a low shrink temperature (to reduce installation time). Unlike other typical flame-retardant tubing, Versafit tubing is free of polybrominated biphenyls (PBBs) and polybrominated biphenyl oxides and ethers (PBBOs/PBBEs). In Europe, these chemicals are classified as environmentally hazardous substances. See for example: https://www.te.com/commerce/DocumentDelivery/DDEController?Action=showdoc&DocId=Data+Sheet%7FVERSAFIT%7F404%7Fpdf%7FEnglish%7FENG_DS_VERSAFIT_404.pdf%7F5562734018, hereby incorporated by reference. In one embodiment, the elastomeric sheathing has flexibility, abrasion resistance and flame retardance at least that of Versafit tubing as described on this webpage.

In one embodiment, the elastomeric material has one or more of the following properties in any combination (tested under ASTM D 2671): a Secant modulus of $1\times10^4$–$2.5\times10^4$ psi, an ultimate elongation of 150-200%, eccentricity (recovered) of 20-40%, tensile strength of 1000 to 1500 psi, heat resistance (7 days at 158° C./316° F.), Corrosive effect no corrosion (7 days at 158° C./316° F.), and copper stability no brittleness, glazing, cracking, no pitting or blackening of copper, followed by test for ultimate elongation percent 90-100%. Additionally, in one embodiment, the elastomeric material has one or more of the following properties in any combination (tested under UL 224): low-temperature flexibility no cracking (1 hour at −45° C./−49° F.), heat shock no cracking UL 224 (1 hour at 136° C./277° F.), Tensile strength psi 50-70%, ultimate elongation 90-100%, and flexibility no cracking. Additionally, in one embodiment, the elastomeric material has passes UL 224, VW-1 flammability test.

The sheathing may be disposed about the ribbon cable in various ways. For example, in one embodiment, discrete sections of the sheathing are slipped over the ribbon cable, and overlapping joints are formed, which are sealed, for example, through heat shrinking. In another embodiment, the ribbon cable is pulled through a long length of sheathing, which is then heat shrunk around the ribbon cable. In yet another embodiment, the sheathing is extruded around the ribbon cable in a continuous process. Still other methods for disposing the sheathing around the ribbon cable will be obvious to those of skill in the art in light of this disclosure.

Referring to FIGS. 2 through 7, one embodiment of a method of preparing the cable assembly 100 is shown. An important aspect of this embodiment of preparing the cable assembly is that the sheathed ribbon cable of the present invention may be terminated with a ferrule using the same tools and methods as a standard ribbon cable. In this respect, the termination of the sheathed ribbon cable with a ferrule is described herein relative to the termination of a conventional ribbon cable.

Figure 2:
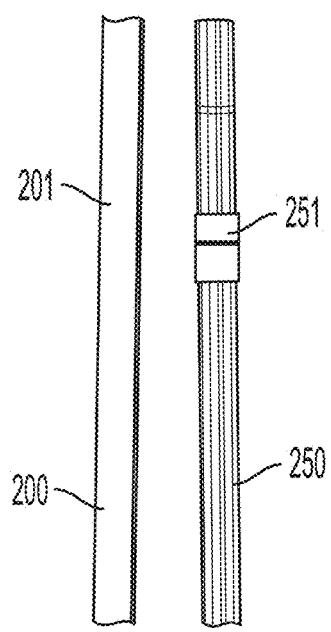
FIG. 2 shows a side-by-side comparison of the sheathed ribbon cable of the present invention (prior to termination of a ferrule) compared to conventional ribbon cable having a boot (also prior to termination of a ferrule).

Referring to FIG. 2, a ribbon cable 200 sheathed by the elastomeric sheathing 201 is shown beside a conventional ribbon cable 250 and the boot 251, which, as described below, is needed in the prior art to prevent adhesive from flowing out of the ferrule during the cable assembly process. In other words, the boot acts as a plug. The cable assembly of the present invention does not require a plug.

Figure 3B:
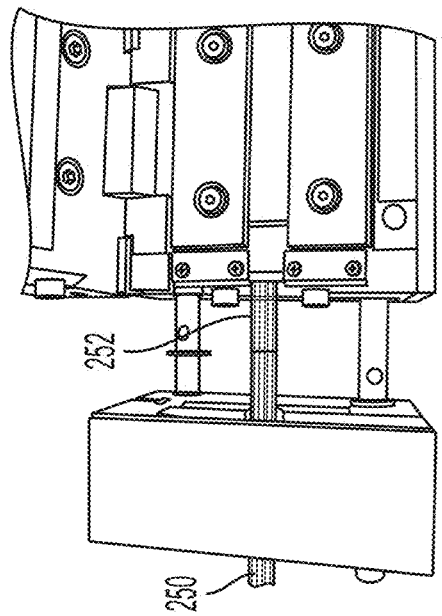
FIGS. 3a-3d show various steps of the process of stripping a conventional ribbon cable and stripping the sheathed ribbon cable of the present invention for termination of a ferrule.
Figure 3D:
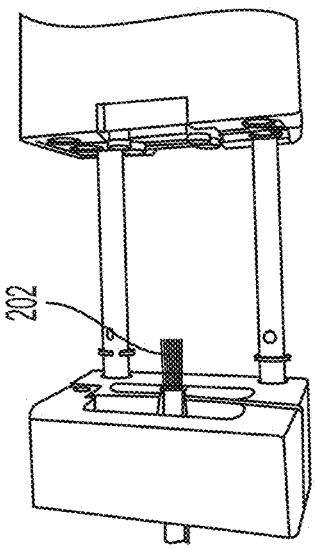
Figure 3A:
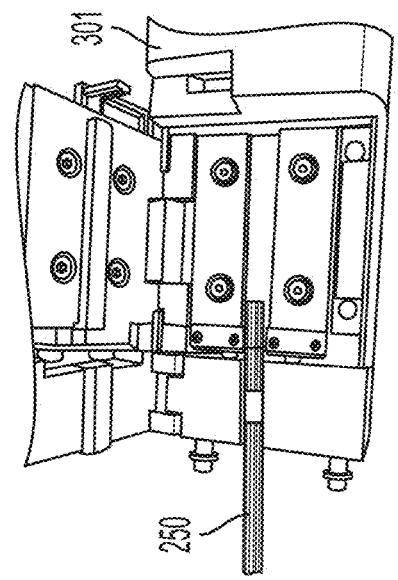

Referring to FIGS. 3a and 3b, the conventional ribbon cable 250 shown in FIG. 2 is placed in a conventional stripping device 301, such as, for example, the Fujikura HJS-02 Hot Stripper. Such devices are well-known and commercially available. FIG. 3a shows the fiber 250 being disposed in the device 301 prior to stripping. FIG. 3b shows the ribbon cable 250 stripped to define a stripped portion 252 at the end of the ribbon cable 250.

Figure 3C:
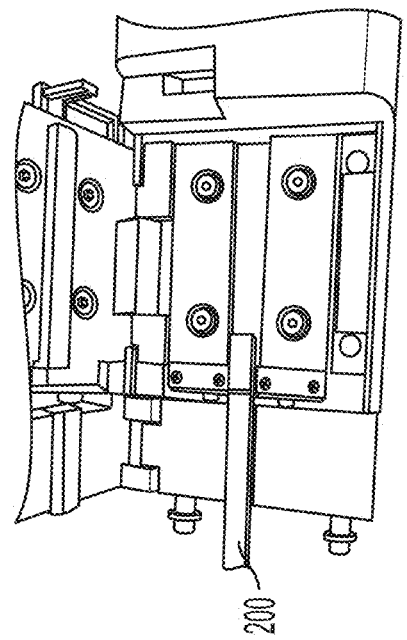

Similarly, in FIGS. 3c and 3d, the sheathed ribbon cable 200 is placed in the same device 301, which is actuated to strip a portion of the sheathed cable 200 to define a stripped portion 202. It should be noted that, during the stripping operation, not only was the coating of the ribbon cable removed (as was done to the conventional ribbon fiber 250 in FIGS. 3a and 3b), but also a portion of the sheathing covering the stripped portion 202 was also removed. No recalibration or alteration of device 301 was needed. This is an important benefit of the present invention—the sheathed ribbon cable of the present invention is terminated using the same techniques and tools as used in terminating a conventional ribbon cable.

Figure 4:
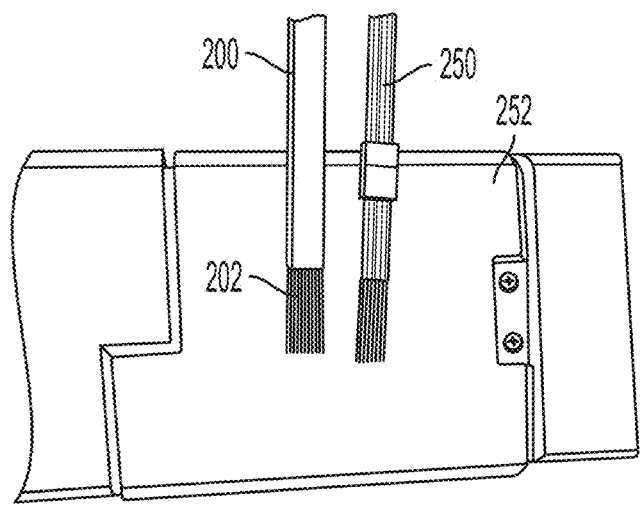
FIG. 4 shows a side-by-side comparison of the stripped sheathed ribbon cable of the present invention and a stripped conventional ribbon cable.

Thus, as shown in FIG. 4, at the end of the identical stripping operation, the sheathed ribbon cable 200 and the conventional ribbon cable 250 both define essentially the same stripped portions 202 and 252, respectively.

Next, the stripped portion of the optical fibers are inserted through a conventional ferrule. Ferrules are well known and, accordingly, they will not be described herein in detail. Suffice to say that certain ferrules are commonly used for ribbon cable, such as, for example, MT ferrules. Suitable ferrules are configured with a front face, also known as a mating face, which is adapted to mate with another optical component such as, for example, a mating face of a transceiver, transmitter, receiver, or other passive or active optical component. Ferrules also have a rear end, essentially opposite that of the mating face, which defines an opening/orifice to receive the fibers such that the fibers can pass through the ferrule to the mating face. Additionally, most ferrules define a cavity for receiving adhesive such as an epoxy or other well-known adhesive for securing fibers to the ferrule. In one embodiment, as described below, the ferrule comprises a window through which adhesive is injected into the ferrule such that the adhesive flows around the fibers to ensure the fibers are secured to the ferrule. This is a well-known technique and will not be discussed further herein.

An important aspect of the invention is that the sheathing around the ribbon cable contacts the rear end of the ferrule to form an adhesive tight seal that prevents the adhesive from flowing out of the rear opening. The configuration of the sheathing contacting the rear end of the ferrule may vary. In one embodiment, the sheathing is received within the rear opening such that the physical contact between the sheathing and the rear opening prevents adhesive from leaking out. Alternatively, the sheathing may butt up against the rear of the ferrule to achieve physical contact sufficient to prevent adhesive from leaking out. In still another embodiment, the rear end may have a protrusion/nipple, which is received in the sheathing with sufficient physical contact to prevent adhesive from leaking out. Still other embodiments will be obvious to those of skill in the art in light of this disclosure. Conversely, in the prior art, a boot 251 is necessary to essentially plug the rear opening of the ferrule to prevent adhesive from leaking out. Thus, in one embodiment, the cable assembly the present invention does not comprise a boot. Thus, a significant benefit of the sheathed ribbon cable of the present invention is not only the abrasion resistance/ durability that the sheathing provides, but also the simplicity in terminating a ferrule by eliminating the need for a boot.

Figure 5A:
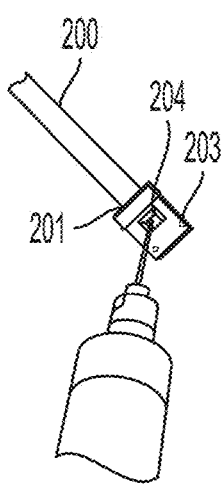
FIGS. 5a-5b show a side-by-side comparison of applying adhesive to a ferrule attached to the sheathed ribbon cable the present invention and to a ferrule attached to a conventional ribbon cable.
Figure 5B:
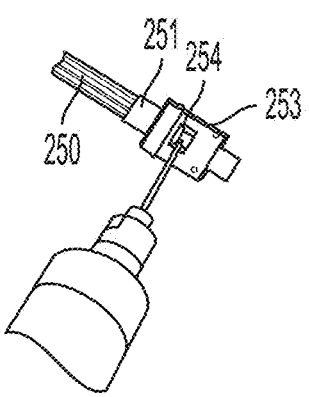

Next, as shown in FIGS. 5*a* and 5B, the adhesive is applied to the ferrule to secure the fibers to the ferrule in a known and conventional way. In this particular embodiment, a syringe is used to inject adhesive through the window in the ferrule into the body of the ferrule such that the adhesive flows around the fibers. In one embodiment, to ensure that the adhesive adequately coats the fibers to form a high integrity bond with the ferrule, the fibers are "pistoned" in the ferrule by sliding the ferrule up and down the stripped fibers. Such a motion serves to ensure that a coating of adhesive is applied around the fibers throughout the ferrule. Again, such technique is known in the art.

Once the liquid adhesive is applied to the ferrule, the assembly is subjected to conditions to facilitate curing of the adhesive. Such conditions can vary according to the application. For example, in one embodiment, the ferrule is heated to cure the adhesive. Alternatively, the adhesive may be a UV-cured type adhesive, in which case, UV light is applied to the ferrule. Still other methods and techniques for curing adhesive will be known to those of skill in the art in light of this disclosure.

Figure 6:
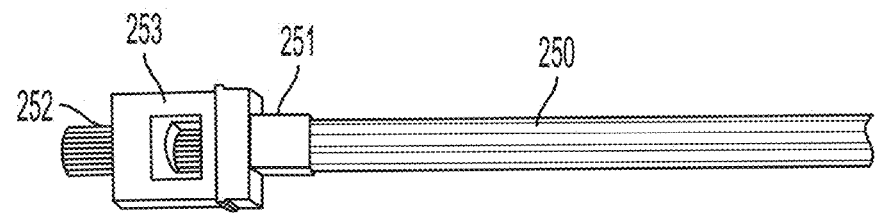
FIG. 6 shows a side-by-side comparison of the almost complete cable assemblies of a conventional ribbon cable terminated with a ferrule and the sheathed ribbon cable of the present invention terminated with a ferrule, with stripped fibers protruding from the mating face of each ferrule.
Figure 6:
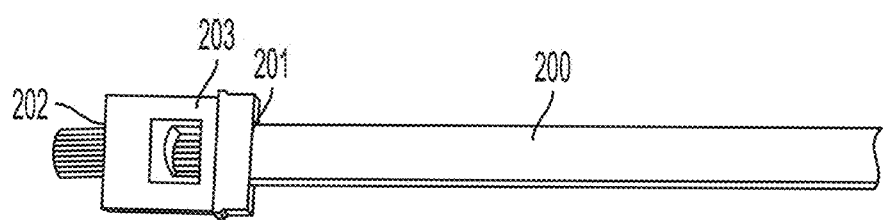
Figure 7:
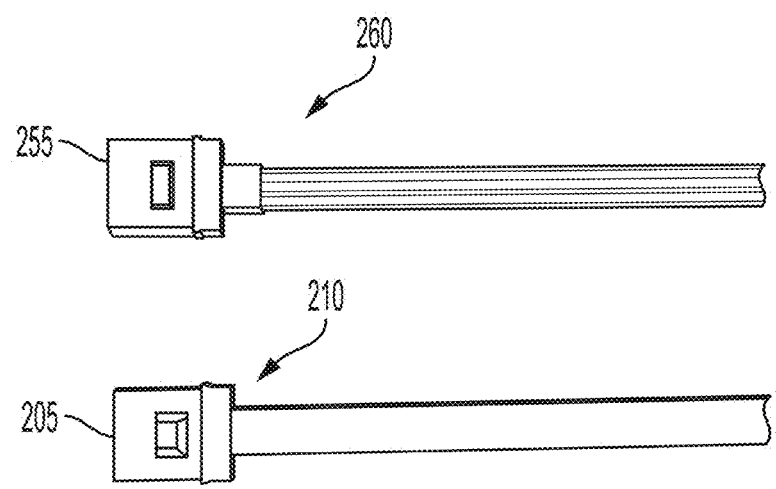
FIG. 7 shows a side-by-side comparison of the completed cable assembly of a traditional ferrule terminated ribbon cable and a ferrule terminated sheathed ribbon cable of the present invention.

Referring to FIG. 6, a side-by-side comparison of the ferrule of the almost completed cable assemblies 200 and 260 of the present invention and conventional art, respectively, are shown with a portion of the strip fibers extending from the mating face of the ferrule. It is important to understand that essentially no extra steps or different tools are used to terminate the ferrule on the sheathed ribbon cable of the present invention or the conventional ribbon cable. Moreover, as mentioned above, the sheathed ribbon cable of the present invention eliminates the need for a boot. Thus, the ferrule termination process is actually simplified.

Next, a portion of the stripped fiber extending from the mating face of the ferrules is removed. Again, this is done through conventional means and will not be discussed in detail herein. Suffice it to say that, conventionally, the stripped fibers are cleaved, and the mating face of the ferrule is polished. However, other embodiments are possible. For example, in one embodiment, the protruding stripped fibers may be removed through laser cleaving or other technique which does not involve polishing. Again, such techniques are known in the art will not to be discussed herein in detail.

In one embodiment, the cable assembly is further encapsulated in a second sheathing such as a convoluted tubing or spiral rigid tubing such as Convalex® tubing or similar material. The applications of Convalex tubing will be obvious of those of skill in the art in light of this disclosure.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A cable assembly comprising:
    a ribbon cable comprising a plurality of optical fibers placed side-by-side, and a coating encapsulating said plurality of optical fibers to form a strip of said plurality of optical fibers, said plurality of optical fibers having endfaces;
    an elastomeric sheathing being disposed over at least a portion of said coating of said ribbon cable and terminating at a sheathing end short of said endfaces such that said endfaces protrude beyond said sheathing end;
    a ferrule having a mating surface presenting said endfaces, and a rear end having a rear opening through which said optical fibers pass, said rear end contacting said sheathing end to form an adhesive-tight seal sufficient to prevent liquid adhesive in said ferrule from flowing out of said rear opening; and
    cured adhesive disposed in said ferrule to secure said optical fibers to said ferrule.

2. The cable assembly of claim 1, wherein said cable assembly does not have a boot.

3. The cable assembly of claim 1, wherein said elastomeric sheathing is a halogen-based material.

4. The cable assembly of claim 1, wherein said elastomeric sheathing is a fluoropolymer material.

5. The cable assembly of claim 1, wherein said is elastomeric sheathing is one of Polyvinylidene fluoride or polyvinylidene difluoride (PVDF), fluorinated ethylene propylene (FEP), perfluoroalkoxy polymer (PFA), or polytetrafluoroethylene (PTFE).

6. The cable assembly of claim 1, wherein said elastomeric sheathing is a silicone-based rubber material.

7. The cable assembly of claim 1, wherein the elastomeric sheathing is a heat shrink material.

8. The cable assembly of claim 1, wherein said elastomeric sheathing is extruded over said coating of said ribbon fiber.

9. The cable assembly of claim 1, wherein said ferrule is an MT ferrule.

10. The cable assembly of claim 1, further comprising a convoluted tubing around said elastomeric sheathing.

11. A method of preparing a cable assembly, said method comprising
    disposing an elastomeric sheathing over a ribbon cable, said ribbon cable having a plurality of optical fibers placed side-by-side, and a coating encapsulating said plurality of optical fibers to form a strip of said plurality of optical fibers;
    stripping a portion of said coating of said ribbon cable and a portion of said sheathing to form stripped optical fibers that protrude beyond an end of said sheathing;
    inserting said stripped optical fibers through a rear opening at a rear of a ferrule such that (a) endfaces of said stripped optical fibers protrude beyond a mating face of said ferrule, and (b) said end of said sheathing contacts said rear to form an adhesive-tight seal between said ferrule and said sheathing;
    disposing liquid adhesive in said ferrule; and
    causing said liquid adhesive to cure.

12. The method of claim 11, wherein disposing said sheathing around said ribbon cable comprises heat shrinking said sheathing around said coating of said ribbon cable.

13. The method of claim 12, wherein disposing said sheathing around said ribbon cable comprises slipping sections of said sheathing over said coating of said ribbon cable to form overlapping joints between said sections, and then sealing said overlapping joints.

14. The method of claim 12, wherein disposing said sheating around said ribbon cable comprises pulling a length of said sheathing over said coating of said ribbon cable.

15. The method of claim 11, wherein disposing said sheathing around said ribbon cable comprises extruding said sheathing around said coating of said ribbon cable.

16. The method of claim 11, wherein causing said liquid adhesive to cure includes one of heating said liquid adhesive or exposing said liquid adhesive to UV light.

17. The method of claim 11, wherein said stripping comprises stripping said portion of said coating and said portion of said sheathing simultaneously in a single operation.

18. The method of claim 17 wherein said stripping is performed using a conventional ribbon cable stripper.

19. The method of claim 11, further comprising enclosing said elastomeric sheathing in convoluted tubing.

* * * * *